Figure 1:
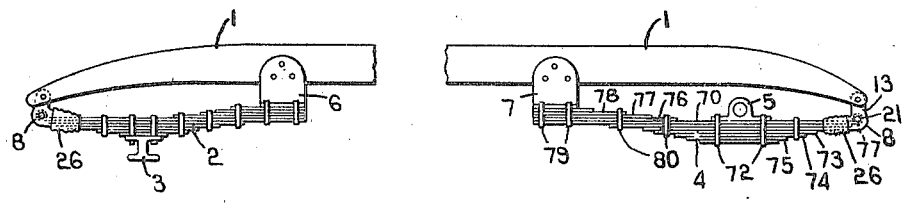

Jan. 23, 1923.

R. M. LOVEJOY.
SPRING CONSTRUCTION FOR VEHICLES.
FILED MAY 25, 1918.

1,443,139.

Inventor.
Ralph M. Lovejoy
by Heard Smith & Tennant
Attys.

Patented Jan. 23, 1923.

1,443,139

UNITED STATES PATENT OFFICE.

RALPH M. LOVEJOY, OF MEREDITH, NEW HAMPSHIRE.

SPRING CONSTRUCTION FOR VEHICLES.

Application filed May 25, 1918. Serial No. 236,461.

*To all whom it may concern:*

Be it known that I, RALPH M. LOVEJOY, a citizen of the United States, and resident of Meredith, county of Belknap, State of New Hampshire, have invented an Improvement in Spring Constructions for Vehicles, of which the following description, in connection with the accompanying drawing, is a specification, like characters on the drawing representing like parts.

This invention relates to improvements in spring constructions for vehicles and is illustrated herein as applied to the frame of an automobile.

The principal object of the invention is to provide means for reducing the torsional strains imposed upon the springs and frame in usual constructions which result from the uneven and irregular raising and lowering of the opposite ends of the axles of the vehicle.

Another object of the invention is to prevent rattling of the joints between the springs and frame.

Another object of the invention is to provide a novel shackle for connecting the ends of the springs to the frame of the machine having means for preventing dust from entering between the ends of the leaves of the spring.

Another object of the invention is to provide a novel spring structure which will permit the use of " flat springs " and provide for greater strength and also greater resilience than in the usual spring structures.

Other objects and features of the invention will more fully appear from the following description and accompanying drawings and will be pointed out in the annexed claims.

Figure 2:
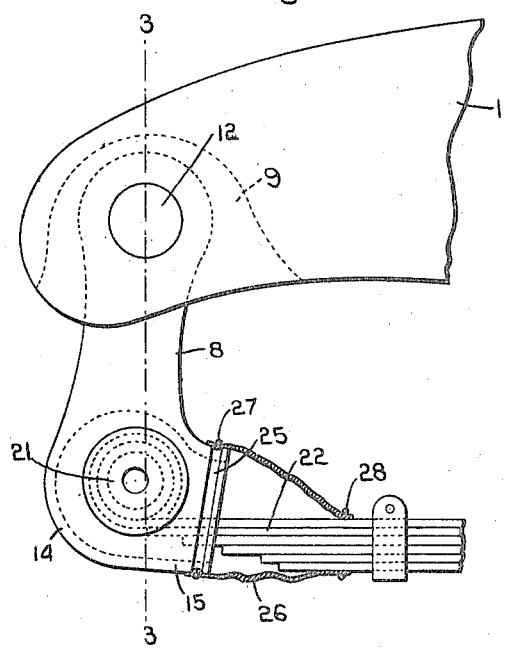
Figure 3:
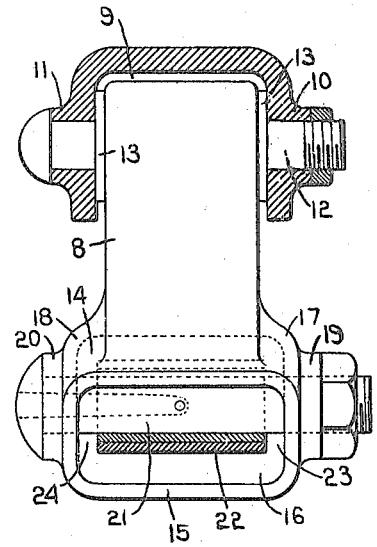

In the drawings:

Fig. 1 is a side elevation of the end portions of a vehicle frame, the central portion being broken away, showing spring constructions embodying my invention secured thereto, Fig. 2 is a detail side elevation of the end of a frame showing a preferred form of shackle embodying my invention secured to the end portion of a spring, Fig. 3 is an end view of the same showing the connection of the shackle to the frame and spring, said frame and spring being illustrated in section.

The present invention is designed to prevent or relieve torsional strain upon the frames and springs of vehicles in which the frames comprise side bars extending longitudinally of the vehicle to which the springs are pivotally connected at one end. One end of each spring, of course, is connected to the frame by a link or shackle to provide for the longitudinal extension of the spring during its flexure.

In usual constructions the pivotal supports for the ends of the spring clamp tightly against the edges of the spring and the outer ends of said supports also are fixedly secured against lateral movement. Usually the links or shackles which connect the ends of the spring to the frame are provided with bolts which may be set up from time to time and special mechanisms have been devised for enabling these bolts to be so set as to take up wear and thereby to prevent rattling.

In some instances springs are used to take up the wear automatically. In all such cases however, the spring and frame are subjected to severe torsional strain, for during the running of the vehicle first one end of the axle and then the other will be raised by reason of the unevenness of the road, thus causing first one spring to lift and then the other.

This alternate and uneven raising of the spring causes a lateral movement of the spring relatively to the side pieces of the frames to which they are secured which either twists the spring or the frame or both. This twisting movement of the frame is imposed through the shackles and their supports which connect the springs to the frame and in a short time will cause sufficient wear to produce an annoying rattling as the end of the spring vibrates back and forth between the side members of the shackle.

The present invention contemplates broadly the provision of means for supporting the frame upon the axle of the vehicle which will permit a lateral free movement sufficient to allow for the raising and lowering of one end of the axle relatively to the other end without imposing any torsional strain upon the frame or springs, sufficient clearance being provided to prevent the laterally moving parts from striking any other member A further object of the invention is to provide a novel built-up spring construction in which the springs are rigidly connected at one end, preferably at their inner ends, to the frame and rigidly connected to the axle or axle housing intermediate of their ends, the free ends of the spring being flexibly connected to the frame. In its preferred construction this is accomplished by providing one or more long leaves with a series of progressively shorter leaves superimposed upon the end which is rigidly connected to the frame and a built-up intermediate portion comprising a series of superimposed progressively shorter leaves connected centrally together and to the axle or axle housing, the end of the long leaf being connected by a shackle to the frame, so that the portion of the spring between the built-up sections will be of less rigidity than the anchored end or intermediate portion and consequently capable of a sinuous flexure intermediate of the built-up portions.

This may be accomplished in various other ways. A preferred mechanism comprises the novel form of shackle which is illustrated in Figs. 1, 2 and 3.

The mechanism disclosed in Fig. 1 comprises a frame 1 having the usual longitudinally extending side bars supported at their front ends upon springs 2, resting upon the front axle 3 and at the rear end upon springs 4 secured to an axle housing 5. The springs 2 and 4 as illustrated in Fig. 1 are rigidly connected at their inner ends respectively to brackets 6 and 7 which are rigidly bolted or otherwise secured to the frame 1.

The outer ends of the springs 2 and 4 are connected by shackles 8, which may be identical in construction, to the ends of the frame 1. A preferred form of shackle construction for thus supporting the outer ends of the spring is shown in Figs. 2 and 3. As illustrated in these figures the ends of the frame 1 are provided with U-shaped recesses 9 to receive the ends of the shackles, the walls of said recesses being provided with bosses 10 and 11 which are apertured transversely to receive the bolts 12 for supporting the upper ends of the shackles. The shackles desirably are in the form of links having transverse apertures to receive the bolts 12, the spacing washers 13 preferably being placed between the walls of the recess and the sides of the links to prevent lateral movement of the links upon the pivot. These washers may however be omitted if desired.

The lower ends of the shackles are provided with hollow heads 14 having laterally extending noses 15, the noses having preferably rectangular openings 16 through which the ends of the springs may be introduced. The end walls 17, 18 of the head extend outwardly a considerable distance and are provided respectively with bosses 19, 20 which are apertured to receive bolts 21 which pass through the usual eyes in the ends of the springs 22.

The walls 17, 18 of the head are spaced a sufficient distance apart to allow ample clearance spaces 23, 24 between the edges of the spring 22 and the walls 17, 18 so that neither wall will be struck by the springs during the uneven raising and lowering of the ends of the springs.

By this construction torsional strains upon the springs and the frame are eliminated or at best reduced to a minimum for it will be obvious that when one end of the axle remains stationary and the other is suddenly raised or lowered by reason of the wheels running over an obstruction or dropping into a hollow the end of the axle carried by the wheel thus raised or dropped will swing through an arc having a center in the hub of the other wheel.

This movement will tend either to extend or to retract the outer end of the axle. The springs if rigidly connected to the frame at both ends will tend to rise upon a chord of said arc and consequently cause a torsional strain upon the spring or frame or both. By my invention however, the lateral movement permitted between the ends of the springs and the walls of the shackle enables the ends of the springs to move laterally relatively to the frame a sufficient distance to compensate for the arcuate movement of the end of the axle and thereby to relieve the torsional strain upon the springs and frame.

By constructing the shackle in the manner aforesaid and providing a hollow closed head to receive the ends of the spring the dust may be easily excluded from the pivotal connection between the spring and shackle.

A convenient means for accomplishing this purpose consists in providing the nose 15 which extends laterally from the head with a circumferential groove 25 over which the enlarged end of a boot 26 may be drawn and clamped therein by a cord or wire 27. The boot 26 may be made of leather, canvas or other flexible material and preferably is of sufficient length to embrace and inclose the ends of the leaves of the spring, the outer end of the boot being clamped upon said spring by a cord or wire 28.

In Fig. 1 a preferred form of spring adapted to be utilized in accordance with my invention is illustrated, said spring being so constructed as to give a minimum amount of resilience and a maximum amount of strength. The spring also is designed as a "flat spring" which will enable the body of the vehicle to be carried as low as possible. The spring illustrated herein comprises a long leaf 70 having at its outer end an eye adapted to engage the pin 21 of the shackle 8. The central portion of said spring is connected to the axle housing 5 by usual U-bolts 72 which also clamp to said axle a series of progressively shorter leaves 73, 74, 75, etc. At its opposite end the long leaf 70 is secured to the bracket 7, a series of progressively shorter leaves 76, 77, 78 being interposed between the long leaf 70 and the bracket 7 and secured to it by U-bolts 79, said leaves also being secured together by the usual clamps 80.

This construction comprises in effect a usual flat spring and an overlapping half of a flat spring, the latter being rigidly secured to the frame. When a weight is imposed upon the spring thus constructed it will bend in a sinuous curve instead of the usual arch shaped curve and the resulting cushioning movement will be more effective.

By reason of the construction above described an improved "Hotchkiss" type of drive through the spring is provided which eliminates the rattling caused by the tendency of the axle to move forwardly and backwardly during the driving and braking operations respectively. This construction also allows for the driving torque to be carried by the spring without the necessity of using torque tubes.

In the well known type of "Hotchkiss" drive the front end of the rear spring is pivotally connected to the frame, usually by an eye in the end of the spring mounted upon a pin which is carried by a bracket rigidly secured to the frame. The opposite or rear end of the spring is connected by a shackle to the frame. The center of the spring is bolted rigidly to the axle housing. The rear axle is driven through the usual differential. When driving power is applied the axle tends to move forward relatively to the frame and when an obstruction is met by the wheels, or when the brakes are applied, the axle tends to move rearwardly relatively to the frame. These movements cause excessive wear upon the pivotal connections of the spring eye to the frame which results very quickly in serious rattling and requires frequent replacement of the pin or the usual bushing in the spring eye or both. By the present invention the use of a pivotal connection to the frame is eliminated so that there is no opportunity for wear and consequent rattling.

In the "Hotchkiss" type of drive the driving torque, which is transmitted to the wheel axles through the differential, imposes a tendency upon the axle housing to rotate about the axis of the driving axle. This tendency to rotate is resisted by the springs which are secured to the axle housing. By the present construction the built-up spring, which is rigidly attached at one end to the frame and flexibly attached at its free end to the frame, is adapted to resist effectively the driving torque, whereas in previous constructions, in which one end of a spring has been attached rigidly to the frame, means have been required to permit a rotative movement between the spring and the axle housing of the driving axle, and a torque rod independent of the spring has been required to resist the torque caused by the rotative movement of the driving axle.

The same spring construction may also be applied to the front axle, as illustrated herein, and its use upon the front axle will be highly advantageous to resist the torque resulting from the use of the front wheel brakes.

It will be understood that the embodiments of the invention herein are merely illustrative and not restrictive and that the principles of the invention may be adapted to other constructions and that the usual shackle constructions may be readily modified to embody the principles disclosed herein.

Having thus described my invention what I claim as new and desire to secure by Letters Patent is:

1. A vehicle comprising a frame, an axle, a spring consisting of a long leaf and a plurality of shorter leaves of successively decreasing length connected together and to said axle, a series of leaves of successively decreasing length superposed upon one end of said long leaf and means for rigidly securing the same together and also rigidly to the frame and a shackle connecting the other end of the long leaf to the frame having means for permitting sufficient lateral movement between the spring and the frame, to prevent the spring when subjected to torsional strain, from contacting with the wall of the shackle.

2. A vehicle comprising a frame, an axle, a spring consisting of a long leaf and a plurality of shorter leaves of successively decreasing length connected together and to said axle, a series of leaves of successively decreasing length superposed upon one end of said long leaf and means for rigidly securing the same together and also rigidly to the frame and means flexibly connecting the other end of the long leaf to the frame.

3. A vehicle comprising a frame, an axle, a flat spring consisting of a long leaf, a plurality of shorter leaves successively decreasing in length connected together and to said axle, a series of leaves of successively decreasing length superposed upon one end of said long leaf, means for rigidly securing the same together and also rigidly to said frame, an eye upon the other end of said long leaf, and a shackle pivotally connected to the eye of said long leaf and to the frame.

4. In combination with a vehicle comprising a frame and an axle, a pair of springs each comprising a long leaf having at one end a plurality of progressively shorter leaves rigidly secured together and to said frame and intermediate of its ends, a series of progressively shorter leaves rigidly secured together and to said axle and means flexibly connecting the other end of said spring to said frame.

5. In a vehicle comprising a frame and an axle, a spring consisting of a long leaf and a plurality of superimposed shorter leaves of successively decreasing length connected substantially centrally together and to said axle, a series of leaves of successively decreasing length superimposed upon the opposite side of said long leaf at one end rigidly connected together and also rigidly secured to the frame, and means flexibly connecting the free end of said spring to the frame.

6. In a vehicle comprising a frame and an axle, a spring consisting of a long leaf and plurality of superimposed shorter leaves of successively decreasing length connected substantially centrally together and to said axle, a series of leaves of successively decreasing length superimposed upon the opposite side of said long leaf at one end rigidly connected together and also rigidly secured to the frame, and means flexibly connecting the free end of said spring to the frame, the superimposed leaves which are connected to the axle being located nearer the free end of the spring than to the end of the spring which is rigidly anchored to the frame.

7. In a vehicle comprising a frame and an axle, a spring consisting of a long leaf and a plurality of superimposed shorter leaves of successively decreasing length connected substantially centrally together and to said axle, a series of leaves of successively decreasing length superimposed upon the opposite side of said long leaf at one end rigidly connected together and also rigidly secured to the frame, the adjacent ends of the superimposed leaves which engage the opposite sides of the long leaf being of sufficient length to overlap, and means flexibly connecting the free end of said spring to the frame.

In testimony whereof, I have signed my name to this specification.

RALPH M. LOVEJOY.